United States Patent [19]

Pinch et al.

[11] 4,013,830
[45] Mar. 22, 1977

[54] VIDEO DISC STYLUS

[75] Inventors: Harry Louis Pinch, Princeton, N.J.;
Herbert Irwin Moss, Yardley, Pa.

[73] Assignee: RCA Corporation, New York, N.Y.

[22] Filed: May 19, 1975

[21] Appl. No.: 578,899

[52] U.S. Cl. .................. 358/128; 204/192 R;
179/100.1 B; 179/100.41 G; 274/38
[51] Int. Cl.² ........................................ G11B 3/44
[58] Field of Search ............................ 204/192, 298;
178/6.6 R, 6.6 A, 6.6 DD; 179/100.1 B, 100.4
R, 100.4 M, 100.41 G; 274/38

[56] References Cited
UNITED STATES PATENTS

| 3,669,860 | 6/1972 | Knowles | 204/192 |
|---|---|---|---|
| 3,798,146 | 3/1974 | Wan | 204/192 |
| 3,826,877 | 7/1974 | Leedom | 178/6.6 A |
| 3,842,194 | 10/1974 | Clemens | 178/6.6 A |
| 3,869,368 | 3/1975 | Beardmore | 204/192 |
| 3,930,117 | 12/1975 | Clemens | 178/6.6 R |

*Primary Examiner*—Bernard Konick
*Assistant Examiner*—Alan Faber
*Attorney, Agent, or Firm*—Glenn H. Bruestle; George E. Haas

[57] ABSTRACT

One end of a support structure of dielectric material tapers to a tip which has a curved bottom surface. A cermet film composed of a conductive material and a dielectric material which adheres well to the support structure is on a portion of the support structure's surface. The concentration of the constituent materials in the cermet film varies through its thickness. The cermet film at the interface with the support structure has a high concentration of dielectric material while the portion of cermet film at its exposed surface has a high conductive material concentration.

5 Claims, 4 Drawing Figures

VIDEO DISC STYLUS

BACKGROUND OF THE INVENTION

This invention relates generally to video disc playback styli and particularly to such styli having a coated electrode for capacitive pickup video disc systems.

Video disc playback systems of a variable capacitance type are disclosed in U.S. Pat. No. 3,842,194 issued on Oct. 15, 1974 to Jon K. Clemens. Also disclosed in that patent and shown in FIG. 5 thereof is a stylus for playing back the recorded information. The disclosed stylus has a sapphire mounting structure with a conducting element deposited on one surface.

Difficulty is often encountered when the conducting element is deposited on the sapphire mounting structure. A metal film is often used as the conducting element. However, many desirable metal films have poor adherence to a polished sapphire surface. For example, it is difficult to deposit sufficiently adherent tungsten, hafnium or chromium films onto such a surface.

SUMMARY OF THE INVENTION

A dielectric support structure tapers at one end to a tip which has a curved bottom surface. A cermet film composed of a dielectric material which adheres well to the support structure and a conducting material is on a portion of the support structure's surface. The concentration of the constituent materials in the cermet film varies through the thickness of the film. The film at the interface with the support structure has a high concentration of the dielectric material while the exposed surface of the film has a high concentration of conducting material.

DESCRIPTION OF THE INVENTION

Figure 1:
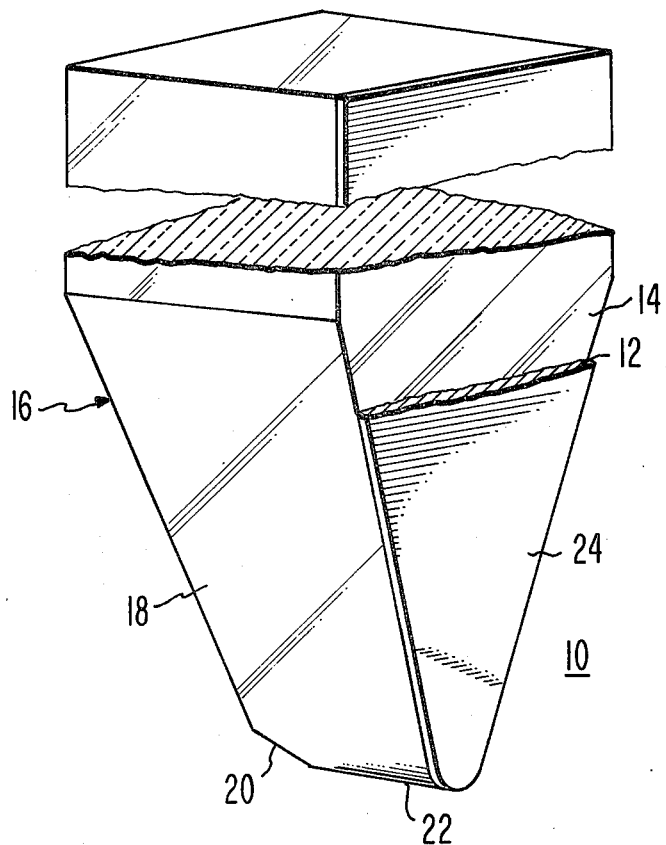
FIG. 1 is a perspective view, partially broken away, of a tip of a playback stylus.
Figure 2:
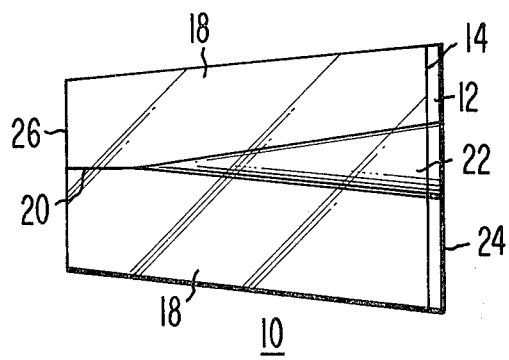
FIG. 2 is a bottom view of the curved bottom of the stylus tip in FIG. 1.

With reference to FIGS. 1 and 2, a video disc stylus 10 has a support structure 16 formed of dielectric material, such as sapphire. The illustrated tip of the support structure 16 has sides 18 extending from a rear face 14 in converging fashion toward the stylus front. The sides 18 meet at the bottom of the stylus front to there define a knife edge 20. Above the knife edge 20, the converging sides 18 terminate at the edges of the triangular front face 26 (not visible in the drawings). To the rear of the knife edge 20, the support structure bottom surface 22 is curved. The tapering rear face 14 of the support structure 16 has converging straight edges which terminate at the curved bottom edge 22.

A cermet film 12 is deposited on the portion of the support structure surface which forms the rear face 14. The cermet film 12 which overlies the face 14 also has converging straight edges which terminate in a curved bottom edge. The cermet film 12 is composed of a mixture of an electrically conductive material such as tungsten, chromium, tantalum, molybdenum, or hafnium and a dielectric material which has a high adherence to the support structure 16. Preferably the dielectric material is the same as in the support structure 16. The concentration of the constituent materials in the cermet film 12 vary through the film's thickness. The cermet film 12 at the interface with the support structure 16 has a relatively high concentration, 85 volume percent for example, of the dielectric material and a relatively low concentration of the conductive material. At the exposed surface 24 of the cermet film 12, the concentration of the conductive material is relatively high, up to 90 volume percent, and the concentration of the dielectric material is correspondingly low.

Since the cermet film 12 has a high initial concentration of the adherent dielectric material and a low conductive material concentration, good adherence exists between the cermet film 12 and the support structure 16, even through the conductive material, when deposited alone, may have poor adherence to the dielectric material of the support structure. As the thickness of the cermet film 12 increases, the metallic concentration also increases until the exposed surface 24 is formed almost entirely of the conducting material, producing an element of high conductivity suitable for use in a variable capacitance video disc playback system.

Figure 3:
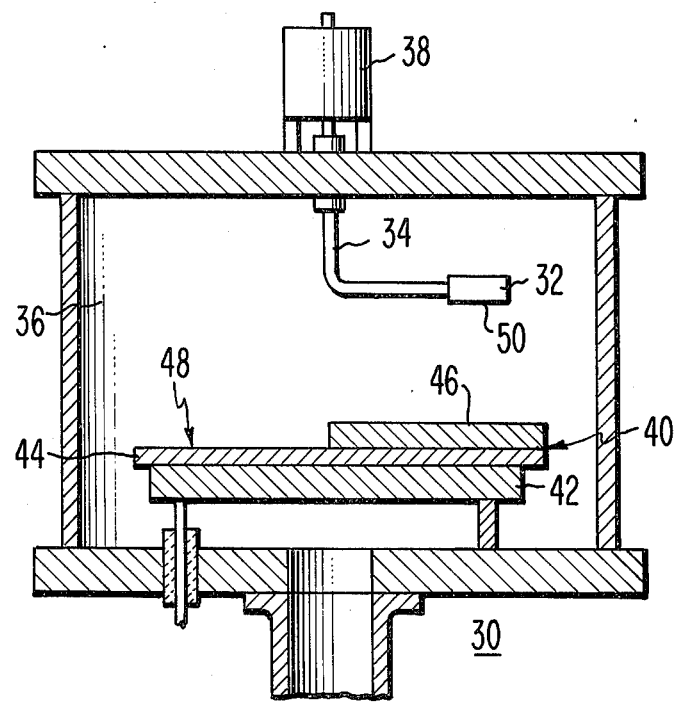
FIG. 3 is a sputtering apparatus which may be used to make the stylus in FIG. 1.
Figure 4:
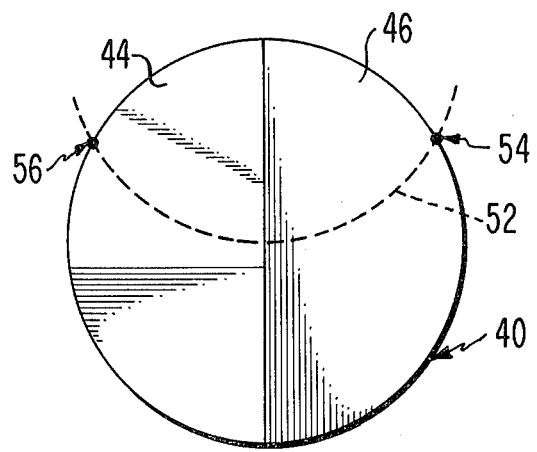
FIG. 4 is an example of a sputtering target for use in the apparatus in FIG. 3.

The above described stylus 10 may be produced using the following method. The cermet film 12 for the conducting element of the stylus is deposited in a radio frequency sputtering apparatus 30 as shown in FIG. 3. A disc shaped substrate 32, of dielectric material such as sapphire, is placed at one end of an L-shaped support 34 within the sputtering chamber 36. The other end of the L-shaped support 34 extends through the sputtering chamber wall and is connected to a rotor 38. Also located within the sputtering chamber 36 is a composite sputtering target 40 mounted on the cathode 42 of the sputtering apparatus 30. The composite target 40 has a section of dielectric material which adheres well to the substrate 32, preferably the same material as the substrate, and a section of a conductive material. Each section serves as a separate source for a component material of the film to be deposited. The embodiment of the target shown in FIGS. 3 and 4 is a disc shaped sheet 44 of conductive material placed upon the cathode 42. A semicircular sheet 46 composed of the dielectric material is placed on the top surface 48 of the conductive material sheet 44 covering approximately one half of the top surface. A similar composite target may be formed with two semicircular sheets adjoining each other at the linear edges.

After the substrate 32 has been placed at the one end of the support 34, the substrate is positioned at a first point 54 which is over the outer edge of the semicircular dielectric sheet 46. The radio frequency sputtering apparatus is then activated causing the target material to leave the top surface, mainly in an upward direction, striking and adhering to the bottom surface of the substrate 32. The rotor 38 is then employed to move the substrate 32 in an arc 52 across the top surface of the target 40. Other patterns of movement such as a straight line may also be used. The substrate is moved until it reaches a second point 56 which is over the outer edge of the disc shaped conductive material sheet 44.

The relative concentration of the conductive and dielectric material in the sputtered material varies depending upon the position over target 40. The concentration of the conductive material is greater near the exposed surface of the disc shaped conductive material sheet 44. Likewise, the dielectric concentration is greater near the semicircular dielectric sheet 46. The concentration of the conductive material in the cermet film 50, therefore, varies depending upon the position of the substrate 32 over the target 40. For example, the concentration of the conductive material in the cermet film is relatively low at the first point 54 and relatively high at the second point 56. Between the first and the second points 54 and 56, the concentration of the conductive and dielectric materials in the deposited film varies from one extreme to the other.

The travel of the wafer 32 through the arc 52 from a first point 54 to the second point 56 deposits a cermet film onto the substrate 32 which varies from a relatively high initial concentration of the dielectric material to a relatively high concentration of the conductive material at the exposed surface 24 of the cermet film 50. This travel through the arc 52 may be continuous or stepped. The rate of the wafer travel is dependent upon the desired thickness and concentration gradient of the cermet 50. The concentration gradient of the cermet film 50 may be varied by starting at different points along the arc 52 or by making an incomplete pass over the target 40.

The cermet film may be formed using other deposition apparatus, for example, an evaporator which has several evaporant sources. In this case the movement of the substrate with respect to the evaporant sources is similar to that in the sputtering method.

After the cermet film 50 has been deposited upon a portion of the surface of the substrate 32, the coated substrate is diced to form at least one parallelepiped unit. To form a stylus 10 from one of these diced units, a first rough lapping step shapes two opposed side surfaces of the unit to form the rear face 14 from the surface containing the cermet film. The converging sides 18 of the stylus tip are also formed during the rough lapping. With appropriate cocking of the unit during the rough lapping, the converging sides 18 form a knife edge 20 angled across one end of the unit. In a finish lapping step, a portion of the knife edge is removed and supplanted by a curved bottom edge 22, with the curve defining an arc of a circle and chosen to substantially match the curvature of nondepressed region of the groove bottom of the disc to be played.

We claim:
1. A stylus comprising:
    a support structure of dielectric material tapering to a tip at one end thereof, the tip having a curved bottom surface; and
    a cermet film on a portion of the support structure's surface, the cermet film composed of a conductive material and a dielectric material which has a high adherence to the support structure, the concentration of the constituent materials in the cermet film varying through the thickness of the film so that the film at the interface with the support structure has a high dielectric concentration while the cermet film at its exposed surface has a high conductive material concentration.
2. A stylus as in claim 1 wherein the dielectric material in the cermet film is the same dielectric material as in the support structure.
3. A stylus as in claim 2 wherein said support structure is formed of sapphire and the dielectric material in the cermet film comprises aluminum oxide.
4. The stylus as in claim 1 wherein said conductive material is selected from a group consisting of tungsten, chromium, tantalum, molybdenum and hafnium.
5. A method for making a video disc stylus comprising the steps of:
    depositing a cermet film onto a portion of the surface of a substrate formed of a dielectric material, the cermet film composed of a dielectric material which is highly adherent to the substrate and a conducting material, the concentration of the constituent materials in the cermet film varying through the thickness of the film so that the cermet film at the interface with the substrate has a relatively high concentration of dielectric material while the cermet film at its exposed surface has a high concentration of the conducting material; and
    forming a tip at one end of the substrate.

* * * * *